(12) United States Patent
Yamamoto

(10) Patent No.: US 11,394,512 B2
(45) Date of Patent: Jul. 19, 2022

(54) WIRELESS COMMUNICATION TERMINAL

(71) Applicant: NEC CORPORATION, Tokyo (JP)

(72) Inventor: Hirohisa Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 16/959,604

(22) PCT Filed: Dec. 27, 2018

(86) PCT No.: PCT/JP2018/048262
§ 371 (c)(1),
(2) Date: Jul. 1, 2020

(87) PCT Pub. No.: WO2019/135397
PCT Pub. Date: Jul. 11, 2019

(65) Prior Publication Data
US 2020/0389275 A1    Dec. 10, 2020

(30) Foreign Application Priority Data

Jan. 4, 2018 (JP) .............................. JP2018-000155

(51) Int. Cl.
*H04L 5/00* (2006.01)
*H04W 4/02* (2018.01)
(Continued)

(52) U.S. Cl.
CPC ............. *H04L 5/0053* (2013.01); *H04W 4/02* (2013.01); *H04W 4/70* (2018.02); *H04W 72/042* (2013.01)

(58) Field of Classification Search
CPC ........ H04L 5/0053; H04W 4/70; H04W 4/02; H04W 4/80; H04W 4/021; H04W 72/042; H04M 1/00
See application file for complete search history.

(56) References Cited

U.S. PATENT DOCUMENTS

2007/0086399 A1* 4/2007 Akiyama .............. H04W 68/00
                                                          370/338
2009/0196220 A1* 8/2009 Tsuruta ............... H04L 65/1069
                                                          370/328
(Continued)

FOREIGN PATENT DOCUMENTS

JP    2006-172223 A    6/2006
JP    2008-298689 A    12/2008
(Continued)

OTHER PUBLICATIONS

Japanese Office Action for JP Application No. 2019-563979 dated Aug. 24, 2021 with English Translation.
(Continued)

*Primary Examiner* — Farid Seyedvosoghi
(74) *Attorney, Agent, or Firm* — Sughrue Mion, PLLC

(57) ABSTRACT

A wireless communication terminal includes: a wireless communication part configured to transmit temporarily remaining information, which is information linked with place and time, to a communication base station and receive the temporarily remaining information stored in the communication base station from the communication base station; a storage device in which the temporarily remaining information received by the wireless communication part is stored; and a deletion part configured to, after receipt of the temporarily remaining information, delete the temporarily remaining information having passed a predetermined time specified in advance.

11 Claims, 13 Drawing Sheets

(51) Int. Cl.
*H04W 4/70* (2018.01)
*H04W 72/04* (2009.01)

(56) References Cited

U.S. PATENT DOCUMENTS

2011/0051648 A1* 3/2011 Kato ................... H04W 88/182
                                                    370/312
2015/0113061 A1* 4/2015 Nakamura ............ H04W 76/10
                                                    709/204
2017/0026983 A1* 1/2017 Murakami ............ H04L 5/0035

FOREIGN PATENT DOCUMENTS

| JP | 2010-054275 A | 3/2010 |
| JP | 2012-090648 A | 5/2012 |
| WO | 2002/057976 A1 | 7/2002 |
| WO | 2005/094110 A1 | 10/2005 |
| WO | 2009/008035 A1 | 1/2009 |
| WO | 2009/091042 A1 | 7/2009 |
| WO | 2017/047063 A1 | 3/2017 |

OTHER PUBLICATIONS

International Search Report of PCT/JP2018/048262 dated Mar. 19, 2019 [PCT/ISA/210].
Written Opinion of PCT/JP2018/048262 dated Mar. 19, 2019 [PCT/ISA/237].

* cited by examiner

Fig.4

| FIT IDENTIFICATION NUMBER | ACQUISITION DAY AND TIME |
|---|---|
| XXXXXXX | yyyy/mm/dd 12:00:00 |
| YYYYYYY | yyyy/mm/dd 12:00:00 |
| ZZZZZZZ | yyyy/mm/dd 14:00:00 |
| ⋮ | ⋮ |

Fig.6

| FIT IDENTIFICATION NUMBER | ACQUISITION DAY AND TIME |
|---|---|
| XXXXXXX | yyyy/mm/dd 9:00:00 |
| YYYYYYY | yyyy/mm/dd 9:02:03 |
| ZZZZZZZ | yyyy/mm/dd 9:04:12 |
| ⋮ | ⋮ |

WIRELESS COMMUNICATION TERMINAL

CROSS REFERENCE TO RELATED APPLICATIONS

This application is a National Stage of International Application No. PCT/JP2018/048262 filed Dec. 27, 2018, claiming priority based on Japanese Patent Application No. 2018-000155 filed Jan. 4, 2018.

TECHNICAL FIELD

The present invention relates to a wireless communication terminal, a wireless communication method, a recording medium, a communication base station, and an electric signboard.

BACKGROUND ART

A search or the like may be performed on the Internet. In such a search, information stored in a DB (DataBase) at a certain point in the past is searched for.

One example of a method for acquiring information is a method of performing transmission and receipt of information by near field communication. For example, handheld game consoles perform data exchange by near field communication called Street Pass Communication®. One example of such a technique is described by Patent Document 1. Patent Document 1 describes a communication system which transmits and receives first data by near field communication. To be specific, according to Patent Document 1, the communication system uses either first data acquired by near field communication or second data acquired in accordance with its movement amount and executes a predetermined process in an application.

Further, another example of the technique for performing near field communication is described by Patent Document 2. Patent Document 2 describes a system in which mobile communication terminals perform near field communication and one acquires identification information of the other. According to Patent Document 2, the system uses the acquired identification information when obtaining the result of determination of matching.

Further, an example of a related technique is described by Patent Document 3. Patent Document 3 describes an example of a technique used when a wireless communication terminal performs position estimation in a system using near field communication.

Patent Document 1: Japanese Unexamined Patent Application Publication No. JP-A 2012-090648
Patent Document 2: Japanese Unexamined Patent Application Publication No. JP-A 2006-172223
Patent Document 3: Japanese Unexamined Patent Application Publication No. JP-A 2008-298689

When performing a search for information, information to be searched is information stored in a DB at a certain point in the past. Therefore, information obtained as a search result may be inaccurate in accordance with a change of the situation of a shop, such as the store being closed or temporarily closed. Thus, there has been a problem that available information corresponding to a condition such as a place and time at which the user is may not be acquired.

Further, in the case of performing near field communication as described in Patent Documents 1 and 2, a temporal communication opportunity is restricted; for example, communication with a person having passed the same place five minutes before cannot be performed. Therefore, even if the techniques as described by Patent Documents 1 and 2 are used, a problem is still unsolved that available information corresponding to a condition such as a place and time at which the user is may not be accurately acquired.

SUMMARY

Accordingly, an object of the present invention is to provide a wireless communication terminal, a wireless communication method, a recording medium, a base station and an electric signboard that solve the problem that available information corresponding to a condition such as a place and time at which the user is may not be accurately acquired.

In order to achieve the object, a wireless communication terminal according to an aspect of the present invention includes: a wireless communication part configured to transmit temporarily remaining information, which is information linked with place and time, to a communication base station and receive the temporarily remaining information stored in the communication base station from the communication base station; a storage device in which the temporarily remaining information received by the wireless communication part is stored; and a deletion part configured to, after receipt of the temporarily remaining information, delete the temporarily remaining information having passed a predetermined time specified in advance.

Further, a wireless communication method according to another aspect of the present invention is a wireless communication method executed by a wireless communication terminal. The method includes: transmitting temporarily remaining information, which is information linked with place and time, to a communication base station and receiving the temporarily remaining information stored in the communication base station from the communication base station; storing the received temporarily remaining information; and after receipt of the temporarily remaining information, deleting the temporarily remaining information having passed a predetermined time specified in advance.

Further, a recording medium according to another aspect of the present invention is a non-transitory computer-readable recording medium having a program recorded thereon. The program includes instructions for causing a wireless communication terminal including a storage device in which temporarily remaining information received by a wireless communication part is stored, to realize: the wireless communication part configured to transmit the temporarily remaining information, which is information linked with place and time, to a communication base station and receive the temporarily remaining information stored in the communication base station from the communication base station; and a deletion part configured to, after receipt of the temporarily remaining information, delete the temporarily remaining information having passed a predetermined time specified in advance.

Further, a communication base station according to another aspect of the present invention includes: a storage device in which temporarily remaining information, which is information linked with place and time, is stored; a wireless communication part configured to receive the temporarily remaining information from a wireless communication terminal and transmit the temporarily remaining information stored in the storage device to the wireless communication terminal; and a deletion part configured to, after receipt of the temporarily remaining information, delete the temporarily remaining information having passed a predetermined time specified in advance.

Further, an electric signboard according to another aspect of the present invention includes: a storage device in which temporarily remaining information, which is information linked with place and time, is stored; and a wireless communication part configured to transmit the temporarily remaining information stored in the storage device to a communication base station.

With the configurations as described above, the present invention can provide a wireless communication terminal, a wireless communication method, a recording medium, a base station and an electric signboard that solve the problem that available information corresponding to a condition such as a place and time at which the user is may not be acquired.

BRIEF DESCRIPTION OF DRAWINGS

FIG. 4 is a view showing an example of information stored in a storage device 112;

FIG. 6 is a view showing an example of information stored in a storage device 122;

EXAMPLE EMBODIMENTS

First Example Embodiment

Figure 1:
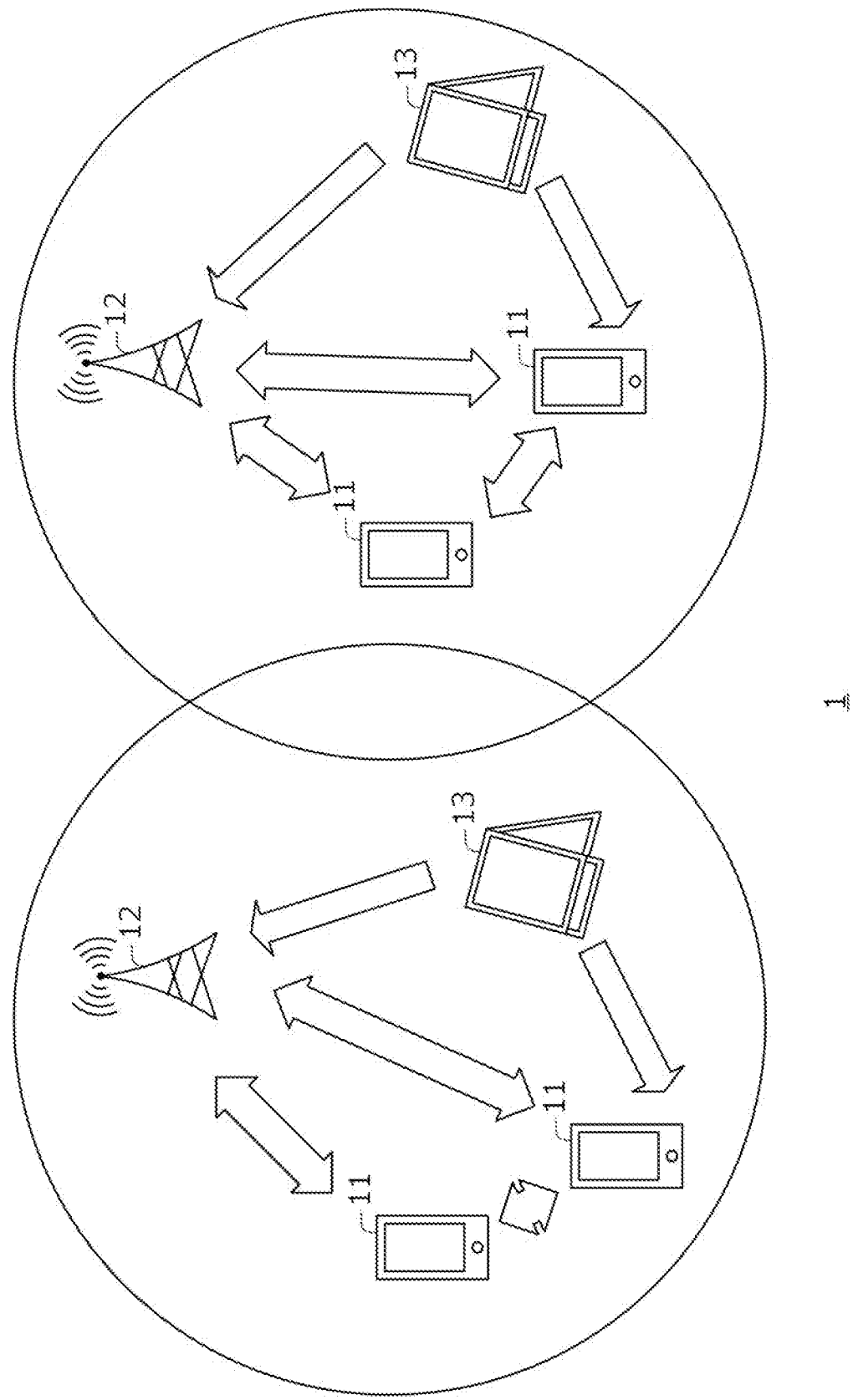
FIG. 1 is a view showing an example of the general configuration of a wireless communication system 1 according to a first example embodiment of the present invention.
Figure 2:
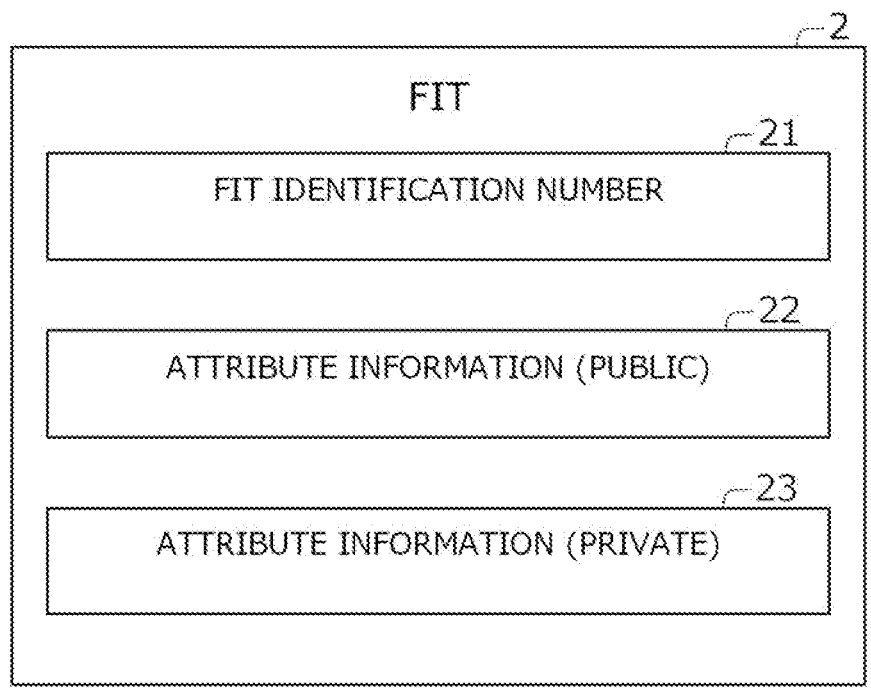
FIG. 2 is a view showing an example of the configuration of a FIT (Fragrance by Information Technology) 2 (also called temporarily remaining information) described in this example embodiment.
Figure 3:
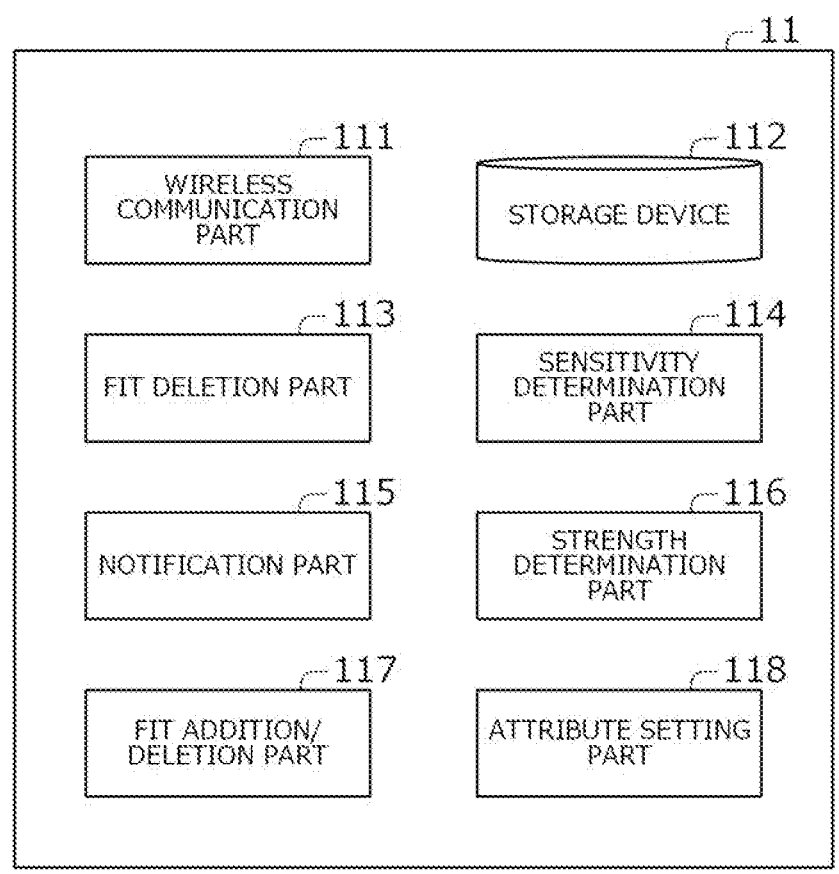
FIG. 3 is a block diagram showing an example of the configuration of a wireless communication terminal 11 shown in FIG. 1.
Figure 5:
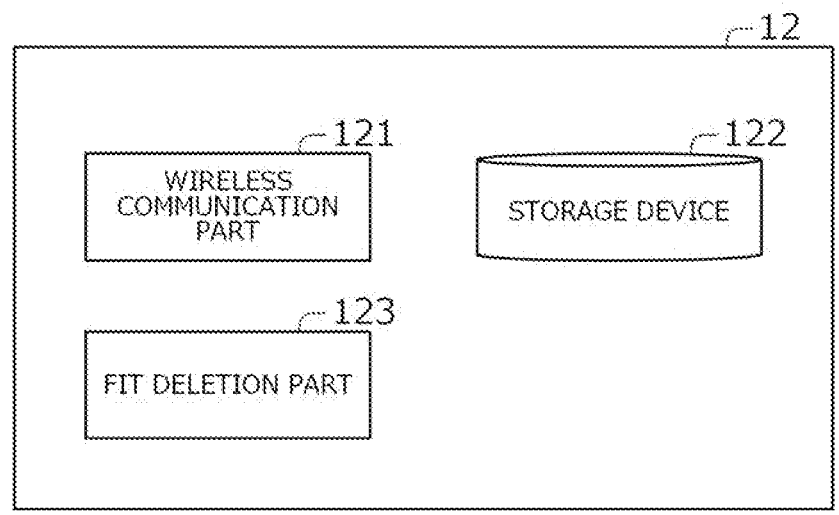
FIG. 5 is a block diagram showing an example of the configuration of a communication base station 12 shown in FIG. 1.
Figure 7:
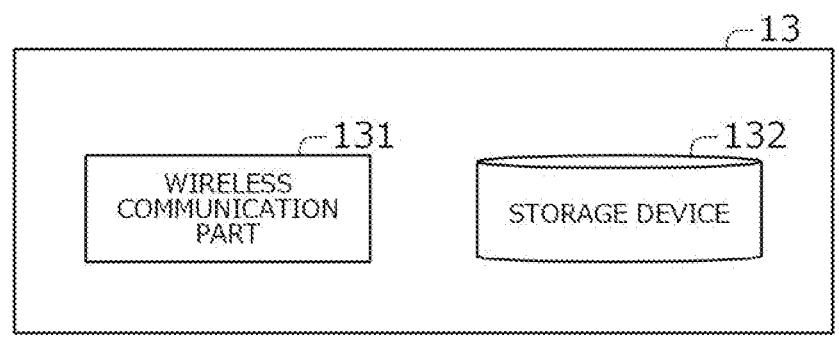
FIG. 7 is a block diagram showing an example of the configuration of an electric signboard 13 shown in FIG. 1.
Figure 8:
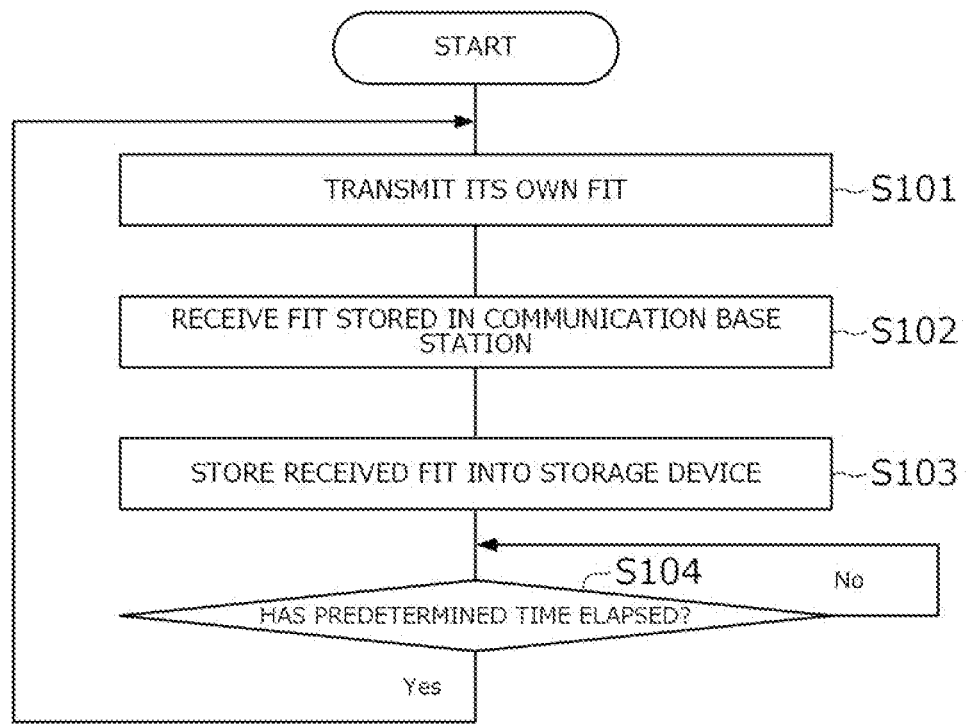
FIG. 8 is a flowchart showing an example of a process executed by the wireless communication terminal 11 in the first example embodiment of the present invention.
Figure 9:
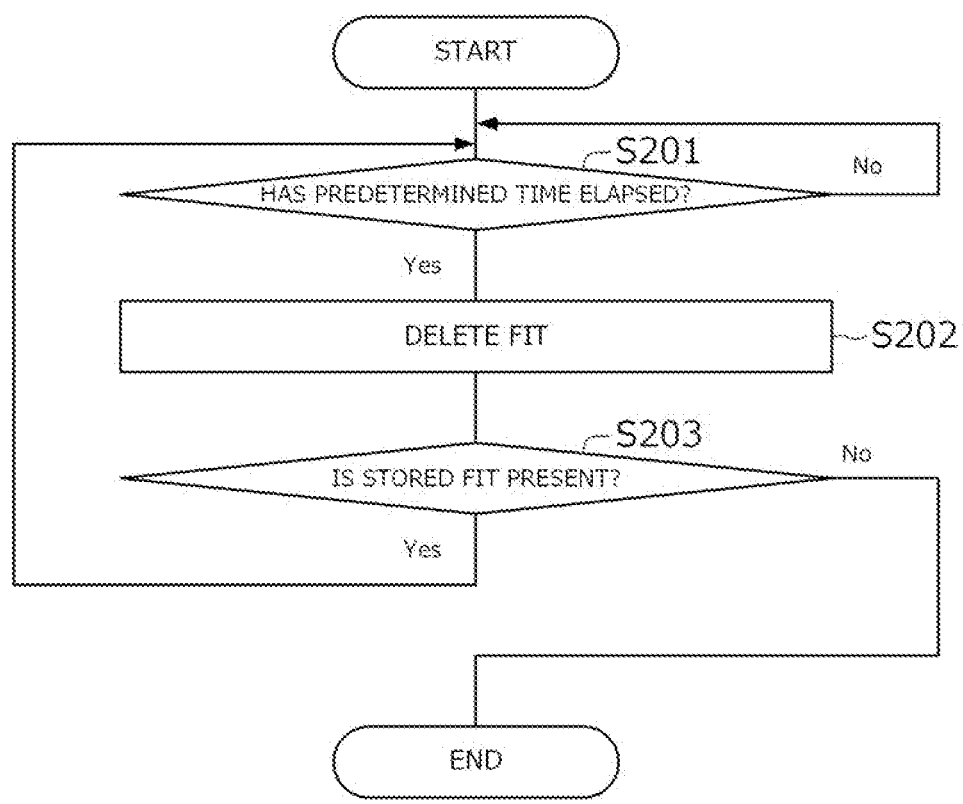
FIG. 9 is a flowchart showing an example of a process executed when the wireless communication terminal 11 deletes the FIT 2 in the first example embodiment of the present invention.
Figure 10:
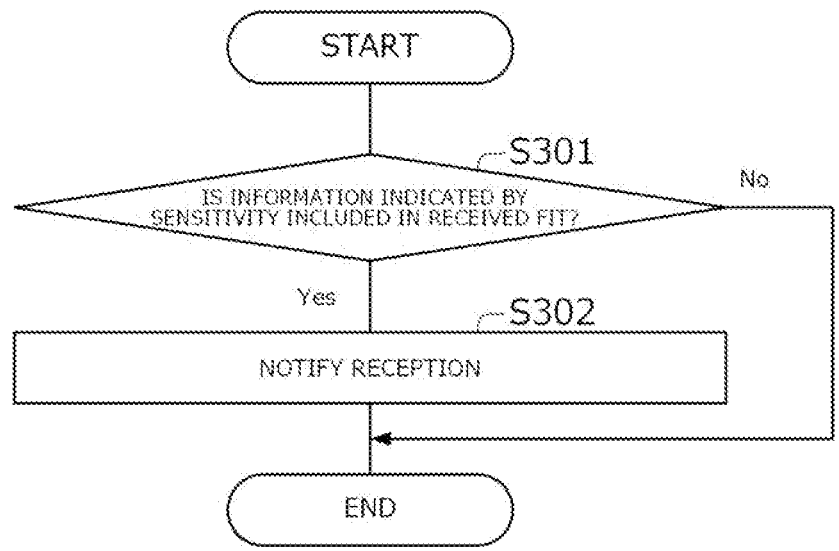
FIG. 10 is a flowchart showing an example of a process executed when the wireless communication terminal 11 performs informing in the first example embodiment of the present invention.
Figure 11:
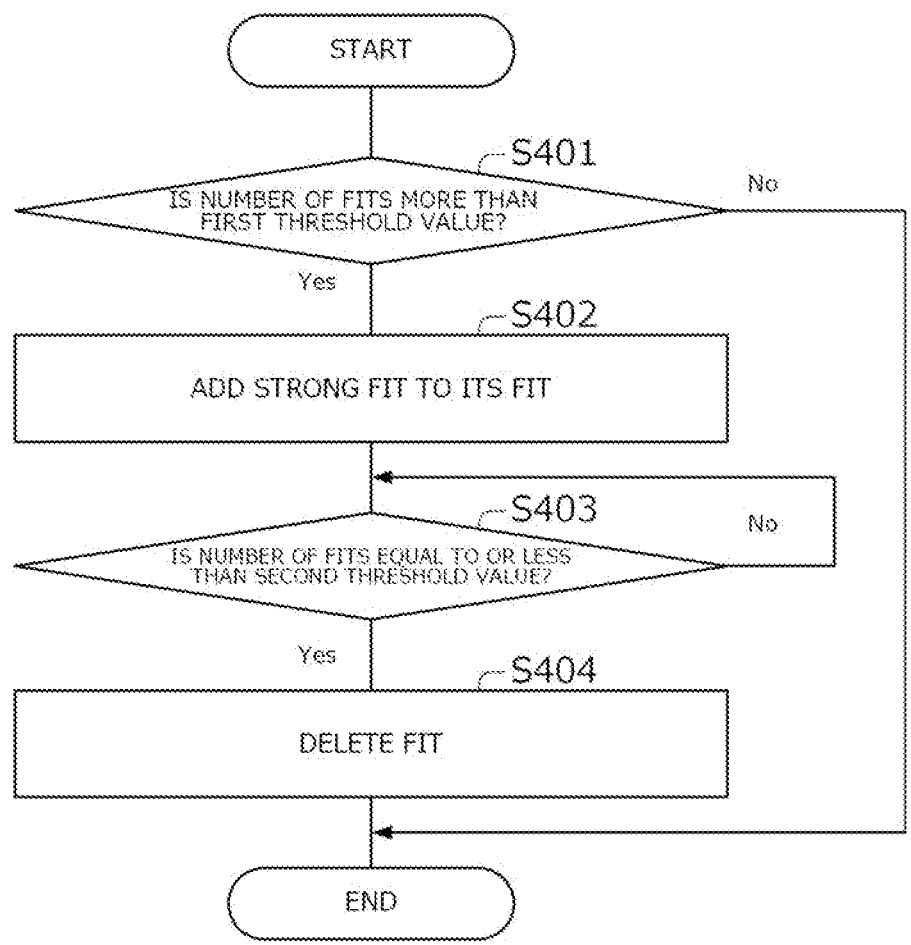
FIG. 11 is a flowchart showing an example of a process executed when the wireless communication terminal 11 determines the strength of the FIT 2 in the first example embodiment of the present invention.
Figure 12:
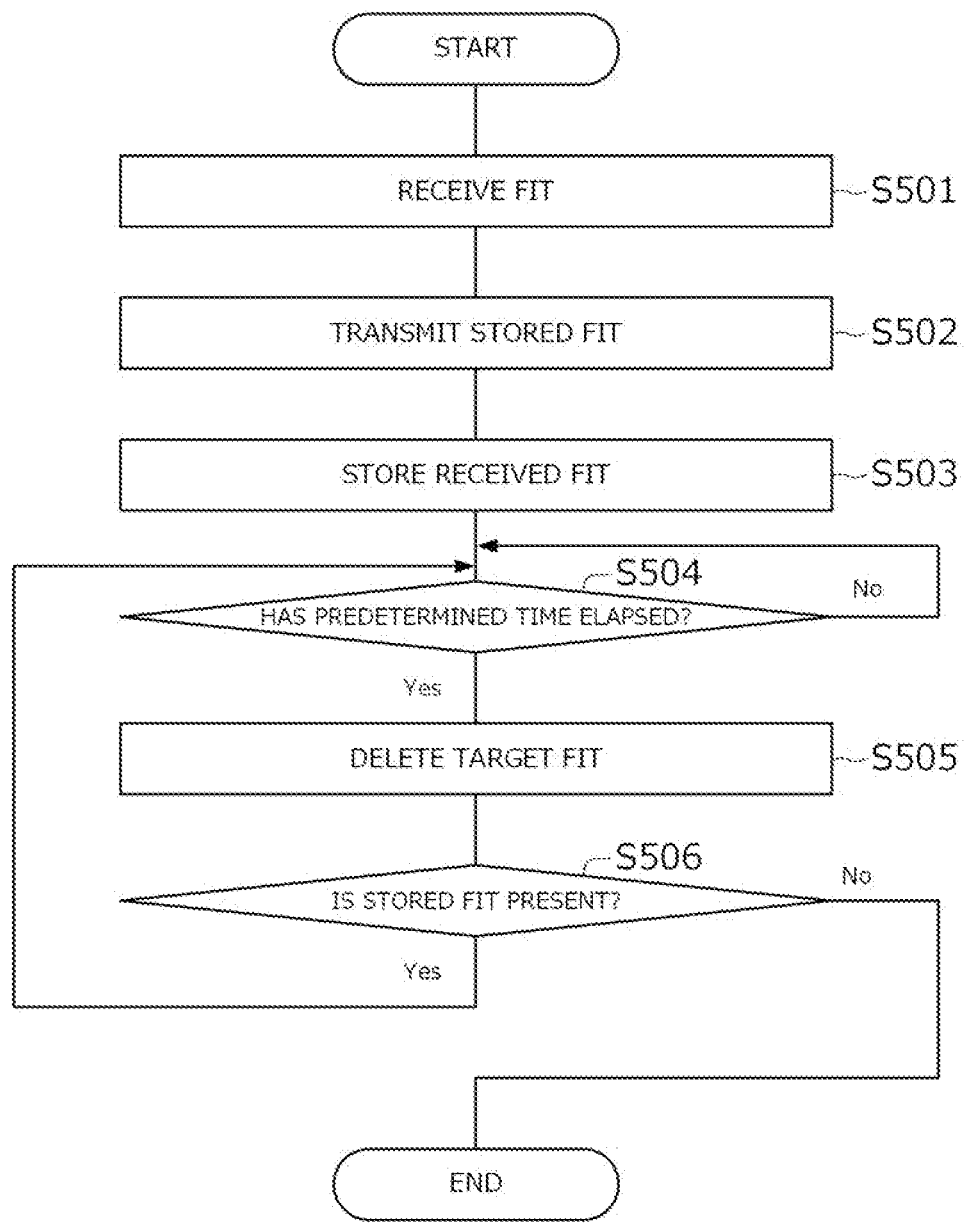
FIG. 12 is a flowchart showing an example of a process executed by the communication base station 12 in the first example embodiment of the present invention.

A first example embodiment of the present invention will be described with reference to FIGS. 1 to 12. FIG. 1 is a view showing an example of the general configuration of a wireless communication system 1. FIG. 2 is a view showing an example of the configuration of a FIT (Fragrance by Information Technology) 2. FIG. 3 is a block diagram showing an example of the configuration of a wireless communication terminal 11. FIG. 4 is a view showing an example of information stored in a storage device 112. FIG. 5 is a block diagram showing an example of the configuration of a communication base station 12. FIG. 6 is a view showing an example of information stored in a storage device 122. FIG. 7 is a block diagram showing an example of the configuration of an electric signboard 13. FIG. 8 is a flowchart showing an example of a process executed by the wireless communication terminal 11. FIG. 9 is a flowchart showing an example of a process executed when the wireless communication terminal 11 deletes the FIT 2. FIG. 10 is a flowchart showing an example of a process executed when the wireless communication terminal 11 performs informing. FIG. 11 is a flowchart showing an example of a process executed when the wireless communication terminal 11 determines the strength of the FIT 2. FIG. 12 is a flowchart showing an example of a process executed by the communication base station 12.

In the first example embodiment, a wireless communication system 1 using the FIT 2 (FIT: a neologism obtained by abbreviating Fragrance by Information Technology), which is information configured to behave in the same manner as a real "fragrance" behaves will be described. The FIT 2 is small information transmitted by a SIM (subscriber identity module) with a unique ID number assigned, which is used in using the wireless communication terminal 11 such as a smartphone. As will be described later, the FIT 2 is liked with place and time, and the transmitted information remains at the place for a predetermined time after the transmission source SIM is away from there. For example, the FIT 2 is not distributed over a wide range via a network, but is distributed to a location corresponding to the position of the wireless communication terminal 11 including the SIM. Moreover, the FIT 2 is deleted after a lapse of a predetermined time specified in advance. Because the FIT 2 is information which temporarily remains within a certain range, the FIT 2 is also called temporarily remaining information.

FIG. 1 shows an example of the general configuration of the wireless communication system 1. Referring to FIG. 1, the wireless communication system 1 includes a plurality of wireless communication terminals 11, a plurality of communication base stations 12, and a plurality of electric signboards 13.

The wireless communication system 1 performs wireless communication conforming to communication standards such as LTE (Long Term Evolution) and 4G (4th Generation), and also performs wireless communication conforming to communication standards such as Wi-Fi® and Bluetooth®. In the wireless communication system 1, for example, transmission and receipt of the FITs 2 is performed between the wireless communication terminal 11 and the communication base station 12 and between the electric signboard 13 and the communication base station 12 by wireless communication compliant with communication standards such as LTE and 4G. In the wireless communication system 1, for example, transmission and receipt of the FITs 2 between the wireless communication terminals 11 is also performed and transmission of the FIT 2 from the electric signboard 13 to the wireless communication terminal 11 is also performed by wireless communication compliant with communication standards such as IEEE802.11 and IEEE802.15.

An example of the FIT 2 that is information used by the wireless communication system 1 in this example embodiment will be described with reference to FIG. 2.

FIG. 2 shows an example of information included by the FIT 2. Referring to FIG. 2, the FIT 2 can include, for example, a FIT identification number 21, attribute information (public) 22, and attribute information (private) 23. Moreover, another FIT 2 satisfying a predetermined condition can be added to the FIT 2 as will be described later. Of the above, the FIT identification number 21 is included by every FIT 2. Meanwhile, the attribute information (public) 22 and the attribute information (private) 23 are set as necessary.

The FIT identification number 21 indicates information for identifying the FIT 2. The FIT identification number 21 is, for example, a unique identification number given for each SIM serving as a transmission source. In other words, the FIT identification number 21 is a unique value which is specified depending on a unique ID number assigned to a SIM.

The attribute information is information indicating an attribute set by the transmitter of the FIT 2 (for example, the user of the wireless communication terminal 11, and a person who installs the electronic signboard 13). The attribute information includes attribute information (public) 22 shared by many and unspecified users and attribute information (private) 23 shared only by specific users.

The attribute information (public) 22 is information that an attribute can be referred to by all the wireless communication terminals 11 having received the FIT 2. The attribute information (public) 22 is set by the transmitter of the FIT 2 as necessary. The attribute information (public) 22 may include one attribute, or may include a plurality of attributes.

The attribute information (private) 23 is information that an attribute can be referred to only by the wireless communication terminal 11 specified in advance of all the wireless communication terminals 11 having received the FIT 2. The attribute information (private) 23 is set by the transmitter of the FIT 2 as necessary. The attribute information (private) 23 may include one attribute, or may include a plurality of attributes.

The attribute information (private) 23 can include, for example, information indicating an attribute and information indicating a condition for referring to the attribute information (private) 23. A condition for referring to the attribute information (private) 23 is, for example; a predetermined attribute is set in the FIT 2 of the wireless communication terminal 11 intending to refer to; a predetermined sensitivity (a predetermined attribute, FIT identification number 21, or the like) is set in a sensitivity determination part 114; and the FIT 2 including the attribute information (private) 23 is determined to be strong by a strength determination part 116. A condition for referring to the attribute information (private) 23 may be any known conditions other than those illustrated above, for example; the wireless communication terminal 11 having received the FIT 2 is a wireless communication terminal specified in advance.

The attribute information (public) 22 and the attribute information (private) 23 included by the FIT 2 may be attribute identification numbers, which are identification numbers that do not discriminate the attribute information (public) 22 from the attribute information (private) 23. The attribute identification number is, for example, a 9-digit number (any digit number is acceptable). In a case where the attribute information (public) 22 and the attribute information (private) 23 are attribute identification numbers, an attribute identification number that a corresponding attribute is publicly available is the attribute information (public) 22 and an attribute identification number that a corresponding attribute is not publicly available is the attribute information (private) 23, for example.

As an example, it is assumed that the correspondence between an attribute identification number "105826603" and an attribute <yakiniku barbecue restaurant> is publicly available. In such a case, in a case where the FIT 2 has the attribute identification number "105286603", the FIT 2 has the attribute information (public) 22 of <yakiniku barbecue restaurant>. Meanwhile, in a case where the FIT 2 has an attribute identification number "217327683" that a corresponding attribute is not publicly available, the FIT 2 has the attribute information (private) 23. In this case, the attribute information (private) 23 added to the FIT 2 is information that only the wireless communication terminal 11 previously having information indicating an attribute corresponding to the attribute identification number "217327683" can refer to the attribute. Thus, the FIT 2 may be configured to include attribute identification numbers that function as the attribute information (public) 22 and the attribute information (private) 23.

Thus, in a case where the FIT 2 has a configuration in which the attribute identification numbers represent the attribute information (public) 22 and the attribute information (private) 23, a process can be simplified. Moreover, because the attribute information (private) 23 is simply composed of an attribute identification number, the content of the attribute information (private) 23 cannot be traced or guessed from the attribute identification number included by the FIT 2. Moreover, it is possible to easily convert the attribute information (private) 23 into the attribute information (public) 22 by a simple method such as disclosing an attribute corresponding to an attribute identification number on the WEB. Moreover, by downloading information indicating an attribute corresponding to an attribute identification number from a WEB site or the like, it is possible to easily update attribute recognition performance.

The attribute information indicates, for example, an attribute corresponding to what the transmitter of the FIT 2 provides. For example, the attribute information can indicate various attributes such as attributes indicating available services including <public restroom>, <gas station>, <yakiniku barbecue restaurant> and <free Wi-Fi installation spot>, attributes indicating the contents and statuses of services including <open>, <temporary closed>, <getting ready>, <full>, <reservation priority>, <takeout OK> and <information on movies currently in theaters>, attributes calling an attention including <zone of frequent traffic accidents>, <under construction>, <road closed> and <threat>, and attributes indicating preference or gathering including <name of occupation> and <name of club> The attribute information may include any attribute other than the attributes illustrated above.

Further, as stated above, another FIT 2 which is determined to be strong is given based on the result of determination by the strength determination part 116 described later is added to the FIT 2. Addition of the FIT 2 is performed by a FIT addition/deletion part 117. Thus, another FIT 2 or other FITs 2 can be added to the FIT 2. A FIT 2 added by the FIT addition/deletion part 117 can be called a transferred FIT because it can be said that a fragrance has transferred to another.

The wireless communication system 1 performs, for example, transmission and receipt of the FITs 2 having the configuration as described above. The FIT 2 is anonymous in principle. Therefore, it is impossible to trace the personal information of the transmission source from the FIT 2.

The wireless communication terminal 11 is, for example, a mobile phone such as a smartphone. The wireless communication terminal 11 may be an information processing device other than that illustrated.

The wireless communication terminal 11 has one FIT 2 or a plurality of FITs 2 of its own with the attribute information being set by the operator of the wireless communication terminal 11. The wireless communication terminal 11 can store a plurality of FITs 2 received from the communication base station 12, another wireless communication terminal 11, the electric signboard 13, and so on. The wireless communication terminal 11 performs, for example, transmission and receipt of the FITs 2 to and from the communication base station 12 in accordance with communication standards such as LTE and 4G. The wireless communication terminal 11 also performs transmission and receipt of the FITs 2 between the wireless communication terminals 11 and also performs receipt of the FIT 2 from the electric signboard 13 by wireless communication conforming to the communication standards such as IEEE 802.11 and IEEE 802.15.

FIG. 3 shows an example of components which are characteristic to this example embodiment among the components of the wireless communication terminal 11. Referring to FIG. 3, the wireless communication terminal 11 includes, for example, a wireless communication part 111, a storage device 112, a FIT deletion part 113, a sensitivity determination part 114, an informing part 115, a strength determination part 116, a FIT addition/deletion part 117, and an attribute setting part 118.

The wireless communication terminal 11 has general components included by a mobile phone terminal, for example, a CPU (Central Processing Unit), a storage device such as a memory, an input device such as a touch screen, a key button and a microphone, and an output device such as a display and a speaker. The wireless communication terminal 11 realizes the respective processing parts stated above, for example, by the CPU executing a program included in the storage device.

The wireless communication part 111 has an antenna that is not shown, and performs transmission and receipt of the FITs 2 with the communication base station 12 in compliant with communication standards such as LTE and 4G. The wireless communication part 111 also performs transmission and receipt of the FITs 2 between the wireless communication terminals 11 and also performs receipt of the FIT 2 from the electronic signboard 13 by near field communication conforming to communication standards such as IEEE802.11 and IEEE802.15.

For example, when the wireless communication terminal 11 enters the communication area of the communication base station 12, the wireless communication part 111 transmits the terminal's FIT 2 stored in the storage device 112 to the communication base station 12. The wireless communication part 111 also receives the FIT 2 stored in the communication base station 12 from the communication base station 12. Then, the wireless communication part 111 stores the received FIT 2 into the storage device 112. At this time, the wireless communication part 111 stores the received FIT 2 in association with the time when having received the FIT 2 into the storage device 112. The wireless communication part 111 executes the process as described above every time the wireless communication terminal 11 enters a new communication area.

Further, the wireless communication part 111 repeatedly executes the above process at predetermined time intervals specified in advance while staying within the same communication area (for example, every one hour, or every two hours; may be any other time intervals). That is, the wireless communication part 111 performs transmission of the FIT 2 to the communication base station 12 at predetermined time intervals in the case of staying within the same communication area. Then, the wireless communication part 111 receives the FIT 2 from the communication base station 12.

Thus, the wireless communication part 111 transmits the terminal's FIT 2 to the communication base station 12, and also receives the FIT 2 stored in the communication base station 12 from the communication base station 12.

The wireless communication part 111 can also be configured to transmit an instruction to acquire the FIT 2 from the communication base station 12, to the communication base station 12 in accordance with an instruction from the operator of the wireless communication terminal 11. Because such an act of acquiring the FIT 2 is a voluntary act of acquiring the FIT 2, it can be said that the acquisition act is an act of sniffing the surrounding FIT 2. By allowing for the act of sniffing the surrounding FIT 2, it is possible to bring the behavior of the FIT 2 closer to the behavior of a real "fragrance". As will be described later, the wireless communication part 111 can also be configured to be able to acquire more detailed information from the communication base station 12 by voluntarily sniffing the FIT 2.

Further, the wireless communication part 111 transmits and receives the FITs 2 to and from another wireless communication terminal 11 that is present in a communication available range, and receives the FIT 2 from the electric signboard 13. For example, the wireless communication part 111 transmits and receives the FITs 2 to and from another wireless communication terminal 11 and receives the FIT 2 from the electric signboard 13 by using the technique used in Street Pass Communication®.

For example, the wireless communication part 111 transmits a predetermined connection request frame to another wireless communication terminal 11 and the electric signboard 13 which are present in a communication available range by broadcasting. In response to this, the other wireless communication terminal 11 and the electric signboard 13 send back predetermined connection response frames. Upon receiving the connection response frames, the wireless communication part 111 transmits the terminal's FIT 2 to the other wireless communication terminal 11 and the electric signboard 13. Then, the other wireless communication terminal 11 and the electric signboard 13 send back the FIT 2 of the other wireless communication terminal 11 and the FIT 2 of the electric signboard 13 to the wireless communication terminal 11 including the wireless communication part 111. After that, the wireless communication part 111 stores the received FITs 2 into the storage device 112. At this time, the wireless communication part 111 stores the received FIT 2 in association with the time when the FIT 2 has been received into the storage device 112. For example, by repeatedly executing such a process at predetermined time periods specified in advance, the wireless communication terminal 11 receives the FITs 2 from the other wireless communication terminal 11 and the electric signboard 13 that are present in the communication range or the electric signboard 13.

When receiving a connection request frame, the wireless communication part 111 can send back a connection response frame. The wireless communication part 111 can also be configured to be able to transmit the connection request frame as described above in accordance with an instruction from the operator of the wireless communication terminal 11.

The storage device 112 is a storage device such as a memory. In the storage device 112, the FIT 2 of the wireless communication terminal 11 is stored, and other FITs 2 received from the communication base station 12, another wireless communication terminal 11, the electric signboard 13 and so on are also stored.

The FIT 2 of the wireless communication terminal 11 stored therein has a configuration as shown in FIG. 2, for example. A detailed description thereof will be omitted because it has already been stated above. The attribute information (public) 22 and the attribute information (private) 23 included by the terminal's FIT 2 are set by the attribute setting part 118 to be described later. Moreover, the other FIT 2 stored in the storage device 112 is added to the terminal's FIT 2 in a case where a predetermined condition is satisfied. In the storage device 112, only one FIT that is the terminal's FIT 2 may be stored, or a plurality of FITs 2 may be stored.

Further, in the storage device 112, separately from the terminal's FIT 2, the FITs 2 received from the communication base station 12, another wireless communication terminal 11, the electric signboard 13 and so on are stored. FIG. 4 shows an example of the FITs 2 stored in the storage device 112, separately from the terminal's FIT 2. Referring to FIG. 4, in the storage device 112, the FITs 2 other than the terminal's FIT 2 are stored in association with the time when the FITs 2 have been received. For example, on the first row of FIG. 4, the FIT 2 with the FIT identification number "XXXXXX" is associated with the acquisition time "yyyy/mm/dd 12:00".

In the storage device 112, information other than the illustrated above may be included. For example, the FIT 2 may be stored in association with, other than the time when the FIT 2 has been received (time information), information indicating a place where the FIT 2 has been acquired (place information). Place information may be information corresponding to a place where the communication base station 12 is installed.

Further, in a case where the FIT 2 having the same FIT identification number is received, the storage device 11 may store the received FIT 2 in association with the time of receipt, or may update the information of the already stored FIT 2. Moreover, in a case where the storage device 112 is configured to update the FIT 2 having the same FIT identification number, the storage device 112 may be configured in a manner that the FIT 2 is stored in association with its time information and also with information indicating the number of times of receipt of the same FIT 2.

The FIT deletion part 113 deletes the FIT 2 having passed a predetermined time since the time of receipt with reference to the storage device 112. That is, the FIT deleting part 113 does not delete the terminal's FIT 2 in which an attribute can be set by the attribute setting part 118, but deletes only the stored FITs 2 received from the communication base station 12, another wireless communication terminal 11, the electric signboard 13, or the like. The time before the FIT deletion part 113 deletes the FIT 2 may be set to any time. For example, the FIT deletion part 113 deletes the FIT 2 after a lapse of 12 hours since the receipt of the FIT 2. The FIT deletion part 113 may also be configured to delete the FIT 2, for example, after a lapse of 24 hours or 48 hours since the receipt of the FIT 2.

Further, in a case where the storage device 112 is configured to store information indicating the number of times of receipt of the same FIT 2 in association with the FIT 2, the FIT deletion part 113 can be configured to decrement the number of times of receipt associated with the FIT 2 every time a predetermined time elapses. Then, the FIT deletion part 113 can be configured to delete the FIT 2 when the number of times of receipt associated with the FIT 2 becomes zero.

The sensitivity determination part 114, when the FIT 2 is received, determines whether or not information indicating an attribute, the FIT identification number 21 and so on that is previously set as sensitivity is included in the received FIT 2. Then, in a case where the information set as sensitivity is included in the received FIT 2, the sensitivity determination part 114 notifies the informing part 115 that the information is included.

For example, sensitivity that indicates an attribute, the FIT identification number 21 and so on is previously set by the operator of the wireless communication terminal 11. Upon receiving the FIT 2, the sensitivity determination part 114 compares the FIT identification number 21, the attribute information (public) 22, the attribute information (private) 23 and so on included by the received FIT 2 with the sensitivity. In a case where the information indicating the sensitivity is included in the received FIT 2, the sensitivity determination part 114 notifies the informing part 115 that the FIT 2 includes the information indicating the sensitivity. In a case where the received FIT 2 does not include the information indicating the sensitivity, the sensitivity determination part 114 does not notify the informing part 115 that the FIT 2 includes the information indicating the sensitivity.

To be specific, it is assumed that, for example, an attribute <yakiniku barbecue restaurant> is set as the sensitivity in advance. In this case, when receiving the FIT 2 with the attribute <yakiniku barbecue restaurant> in the attribute information (public) 22, the sensitivity determination part 114 determines that the information indicating the sensitivity is included by the received FIT 2. Then, the sensitivity determination part 114 notifies the informing part 115 that the FIT 2 includes the information indicating the sensitivity. Meanwhile, for example, in a case where the attribute <yakiniku barbecue restaurant> is not included in the attribute information (public) 22 and the attribute <yakiniku barbecue restaurant> is not included in the attribute information (private) 23 that can be referred to, the sensitivity determination part 114 determines that the information indicating the sensitivity is not included by the received FIT 2. Then, the sensitivity determination part 114 does not notify the informing part 115 that the FIT 2 includes the information indicating the sensitivity.

The sensitivity determination part 114 may be configured to, for example, respond to the attribute of the transferred FIT. For example, the sensitivity determination part 114 can be configured to determine whether or not information indicating an attribute, the FIT identification number 21 and so on that is set as sensitivity is included by the received transferred FIT. The sensitivity of the FIT 2 may be the same as that of the transferred FIT, or may be different from that of the transferred FIT.

The informing part 115 performs informing in accordance with notification from the sensitivity determination part 114. For example, when receiving notification from the sensitivity determination part 114, the informing part 115 performs informing corresponding to the notification from the sensitivity determination part 114 by a method such as sounding an alarm or activating vibration.

The strength determination part 116 determines the strength of the received FIT 2. For example, the strength determination part 116 determines the strength of the FIT 2 based on the number of the FITs 2 having the same FIT identification number stored in the storage device 112.

For example, the strength determination part 116 compares the number of the FITs 2 having the same FIT identification number stored in the storage device 112 with a predetermined first threshold value A (any value may be set). In a case where the number of the FITs 2 having the same FIT identification number stored in the storage device 112 is more than the first threshold value A, the strength determination part 116 determines that the FIT 2 having that FIT identification number is strong (fragrance is strong). Then, the strength determination part 116 notifies the FIT addition/deletion part 117 that it has determined the FIT 2 to be strong. In a case where the number of the FITs 2 stored is equal to or less than the first threshold value A, the strength determination part 116 does not perform the notification to the FIT addition/deletion part 117.

Further, the strength determination part 116 compares the number of the FITs 2 having the same FIT identification number determined to be strong with a predetermined second threshold value B. When the number of the FITs having the same FIT identification number determined to be strong becomes equal to or less than the second threshold value, the strength determination part 116 determines that the FIT 2 having that FIT identification number has weakened (fragrance has weakened). Then, the strength determination part 116 notifies the FIT addition/deletion part 117 that the FIT 2 is determined to have weakened. While the number of the FITs 2 having the same FIT identification number determined to be strong is more than the second threshold value B, the strength determination part 116 does not perform the notification to the FIT addition/deletion part 117. The second threshold value B may be any value, for example, a value smaller than the first threshold value A.

In a case where the storage device 112 is configured to store information indicating the number of times of receipt of the same FIT 2 in association with the FIT 2, the strength determination part 116 can be configured to determine the strength of the FIT 2 based on information indicating the number of times of receipt stored in association with the FIT 2. Alternatively, the strength determination part 116 may be configured to, for example, separately from the storage device 112, count the number of the FITs 2 having the same FIT identification number 21 acquired within a predetermined time and determine the FIT 2 to be strong based on the result of counting. The strength determination part 116 may be configured to determine the strength of the FIT 2 by any method other than the method based on the reference result of the storage device 112.

The strength determination part 116 determines the strength of the FIT 2 based on the number of the FITs 2 having the same FIT identification number 21. Meanwhile, the strength determination part 116 may be configured to, for example, determine the strength of the FIT 2 based on attributes included by the attribute information (public) 22 and the attribute information (private) 23 that can be referred to. For example, in a case where the number of the FITs 2 having the same attribute among the FITs 2 stored in the storage device 112 is more than a third threshold value C (may be the same value as or a different value from the first threshold value A), the strength determination part 116 can determine the FIT 2 to be strong. Thus, the strength determination part 116 can be configured to determine the strength of the FIT 2 based on the number of the FITs 2 having the same information such as the FIT identification number 21 or attributes included by the attribute information (public) 22 and so on.

The FIT addition/deletion part 117 adds another FIT 2 to the terminal's FIT 2 in accordance with the result of determination by the strength determination part 116. The FIT addition/deletion part 117 also deletes another FIT 2 added to the terminal's FIT 2 in accordance with the result of determination by the strength determination part 116.

For example, the FIT addition/deletion part 117 receives notification that the FIT 2 is determined to be strong from the strength determination part 116. Then, the FIT addition/deletion part 117 adds the FIT 2 determined to be strong to the terminal's FIT 2. Moreover, for example, the FIT addition/deletion part 117 receives notification that the FIT 2 has weakened from the strength determination part 116. Then, the FIT addition/deletion part 117 deletes the FIT 2 determined to have weakened from the terminal's FIT 2.

The FIT addition/deletion part 117 may be configured to add the FIT determined to be strong to all the terminal's FITs 2 stored in the storage device 112, or may be configured to add the FIT 2 determined to be strong only to the terminal's FIT 2 selected beforehand from among the terminal's FITs 2 stored in the storage device 112. Moreover, the FIT addition/deletion part 117 may be configured to add the FIT determined to be strong to the terminal's FIT 2 with no limit, or may be configured to set the upper limit of the number of other FITs 2 added to the terminal's FIT 2.

Thus, the FIT addition/deletion part 117 adds another FIT 2 to the FIT 2 and deletes another FIT 2 added to the terminal's FIT 2 based on the result of determination by the strength determination part 116. Because it can be said that the FIT 2 added by the FIT addition/deletion part 117 is a fragrance transferred to another, such a FIT 2 can be called a transferred FIT.

The attribute setting part 118 performs setting of the terminal's FIT 2. For example, the attribute setting part 118 adds ands deletes attributes to the attribute information (public) 22 and the attribute information (private) 23 in accordance with the operation by the operator of the wireless communication terminal 11. As stated above, an attribute that can be set by the attribute setting part 118 is not particularly limited.

The above is an example of the configuration of the wireless communication terminal 11.

The communication base station 12 is connected to another communication base station 12 so as to be able to communicate with each other via a network that is not shown. To the communication base station 12, one communication area (cell) is assigned. The communication base station 12 may be configured so that a plurality of cells can be assigned thereto.

The communication base station 12 performs wireless communication with the wireless communication terminal 11 and the electric signboard 13 located within the cell assigned to the communication base station 12. For example, the communication base station 12 performs transmission and receipt of the FITs 2 with the wireless communication terminal 11 located within the assigned cell. Moreover, the communication base station 12 receives the FIT 2 from the electric signboard 13. The communication base station 12 in this example embodiment stores the received FIT 2 into a storage device 122, but does not perform transmission to an external device via the network. The communication base station 12 is configured to be able to simultaneously communicate with a plurality of wireless communication terminals 11 and electric signboards 13.

FIG. 5 shows an example of components that are characteristic to this example embodiment of the components of the communication base station 12. Referring to FIG. 5, the communication base station 12 includes, for example, a wireless communication part 121, the storage device 122, and a FIT deletion part 123.

For example, the communication base station 12 has a general configuration as the communication base station 12, and also includes an information processing device that is not shown. The information processing device includes a CPU and a storage device such as a memory and a hard disk, which are not shown. The communication base station 12 realizes the respective processing parts mentioned above by the CPU executing a program included in the storage device.

The wireless communication part 121 has an antenna that is not shown, and performs transmission and receipt of the FITs 2 with the wireless communication terminal 11 and performs receipt of the FIT 2 from the electric signboard 13 in accordance with communication standards such as LTE and 4G.

For example, the wireless communication part 121 receives the FIT 2 from the wireless communication terminal 11. Then, the wireless communication part 121 transmits the FIT 2 other than the FIT 2 having the same FIT identification number as the received FIT 2 among the FITs 2 stored in the storage device 122, to the transmission source wireless communication terminal 11. Moreover, the wireless communication part 121 stores the received FIT 2 into the storage device 122.

The wireless communication part 121 executes the above process every time receiving the FIT 2 from the wireless communication terminal 11.

The communication base station 12 may receive not the FIT 2 as it is but an instruction to acquire the FIT 2 from the wireless communication terminal 11. Upon receiving such an instruction, the communication base station 12 also transmits the FIT 2 stored in the storage device 122 to the wireless communication terminal 11.

Further, the communication base station 12 may be configured to transmit all the FITs 2 stored in the storage device 122 to the wireless communication terminal 11, or may be configured to transmit only some of the FITs 2 stored in the storage device 122 to the wireless communication terminal 11. Moreover, the communication base station 12 may be configured to delete part of the attribute information included by the FIT 2 stored in the storage device 122 and transmit to the wireless communication terminal 11. The communication base station 12 may also be configured to, for example, when the wireless communication terminal 11 transmits the FIT 2 thereto, delete part of the attribute information included by the FIT 2 and transmit to the wireless communication terminal 11 and, on the other hand, when the wireless communication terminal 11 transmits an instruction to acquire the FIT 2 thereto, transmit the FIT 2 to the FIT 2 without deleting the attribute information. With such a configuration, when the wireless communication terminal 11 actively smells the FIT 2, the communication base station 12 can transmit a more detailed FIT 2.

Further, the wireless communication part 12 receives the FIT 2 from the electric signboard 13. Then, the wireless communication part 121 stores the received FIT 2 into the storage device 122. The wireless communication part 121 may be configured to transmit the FIT 2 stored in the storage device 122 to the electric signboard 13, or may be configured not to transmit to the electric signboard 13.

The storage device 122 is a storage device such as a memory or a hard disk. In the storage device 122, the FITs 2 received from the wireless communication terminal 11, the electric signboard 13 and so on are stored.

FIG. 6 shows an example of the FIT 2 stored in the storage device 122. Referring to FIG. 6, the FIT 2 is stored in association with the time when the FIT 2 has been received. For example, on the first row of FIG. 6, the FIT 2 having the FIT identification number "XXXXXXX" is associated with the acquisition day and time "yyyy/mm/dd 9:00:00".

The FIT deletion part 123 refers to the storage device 122 and deletes the FIT 2 having passed a predetermined time since the time of receipt. In other words, the FITs 2 received from the wireless communication terminal 11, the electric signboard 13 and so on are deleted from the storage device 112 by the FIT deletion part 123 after a predetermined time has elapsed.

The time until the FIT deletion part 123 deletes the FIT 2 may be set to any time (for example, 12 hours, 24 hours, or 48 hours). For example, the time until the FIT deletion unit 123 deletes FIT 2 may be the same as the time until the FIT deletion part 113 deletes FIT 2, or may be longer than the time until the FIT deletion part 113 deletes the FIT 2.

The above is an example of the configuration of the communication base station 12.

The electric signboard 13 is, for example, a signboard installed on the street, and has a function to perform wireless communication. The electric signboard 13 has one or a plurality of FITs 2 of itself in which the attribute information is set by a person who installs the electric signboard 13. For example, the electric signboard 13 transmits the FIT 2 to the communication base station 12 in accordance with communication standards such as LTE and 4G. Moreover, the electric signboard 13 transmits the FIT 2 to the wireless communication terminal 11 by wireless communication conforming to communication standards such as IEEE802.11 and IEEE802.15.

FIG. 7 shows an example of components which are characteristic to this example embodiment of the components of the electric signboard 13. Referring to FIG. 7, the electric signboard 13 has, for example, a wireless communication part 131 and a storage device 132.

For example, the electric signboard 13 includes an information processing device which is not shown. The information processing device includes a CPU and a storage device such as a memory or a hard disk, which are not shown. The electric signboard 13 realizes the abovementioned processing parts by the CPU executing a program included in the storage device.

The wireless communication part 131 has an antenna which is not shown, and transmits the FIT 2 to the communication base station 12 in accordance with communication standards such as LTE and 4G. Moreover, the wireless communication part 131 transmits the FIT 2 to the wireless communication part 11 by near field communication conforming to communication standards such as IEEE802.11 and IEEE802.15.

For example, the wireless communication part 131 transmits the FIT 2 stored in the storage device 132 at predetermined time intervals (for example, one hour, two hours, or any other time intervals) to the communication base station 12 while the power is on. When the wireless communication part 131 receives the FIT 2 stored in the communication base station 12 from the communication base station 12, the wireless communication part 131 discards the received FIT 2 without storing it in the storage device 132. The wireless communication part 131 may be configured to store the received FIT 2 into the storage device 132.

Thus, the wireless communication part 131 transmits its FIT 2 to the communication base station 12 at regular intervals.

Further, for example, the wireless communication part 131 transmits the FIT 2 to the wireless communication terminal 11 that is present within the communication available range. For example, the wireless communication part 131 receives a connection request frame. Then, the wireless communication part 131 sends back a predetermined connection response frame in accordance with the received connection request frame. After that, upon receiving the FIT 2 from the wireless communication terminal 11, the wireless communication part 131 sends back the signboard's FIT 2 to the wireless communication terminal 11. The electric signboard 13 may store or may not store the received FIT 2 into the storage device 132.

The wireless communication part 131 may be configured to transmit a connection request frame.

The storage device 132 is a storage device such as a memory. In the storage device 132, the FIT 2 of the electric signboard 13 is stored. In the storage device 132, the FITs 2 received from the communication base station 12, the wireless communication terminal 11 and so on may be stored.

The above is an example of the configuration of the electric signboard 13.

The wireless communication system 1 has, for example, the wireless communication terminal 11, the communication base station 12 and the electric signboard 13 that have the configurations as described above.

Next, referring to FIGS. 8 to 12, an example of the operation of the wireless communication system 1 will be described.

First, referring to FIG. 8, an example of a process executed when the wireless communication terminal 11 transmits the FIT 2 will be described. FIG. 8 is a flowchart showing an example of the process executed by the wireless communication terminal 11. Referring to FIG. 8, for example, when the wireless communication terminal 11 enters the communication area of the communication base station 12, the wireless communication part 111 transmits the terminal's FIT 2 stored in the storage device 112 to the communication base station 12 (step S101).

The wireless communication part 121 of the communication base station 12 receives the FIT 2 transmitted by the wireless communication terminal 11. Then, the communication base station 12 transmits the FIT 2 stored in the communication base station 12 to the wireless communication terminal 11.

The wireless communication part 111 of the wireless communication terminal 11 receives the FIT 2 transmitted by the communication base station 12 (step S102). Then, the wireless communication part 111 stores the received FIT 2 into the storage device 112 (step S103).

Further, the wireless communication part 111 of the wireless communication terminal 11 confirms whether or not a predetermined time has elapsed since last transmission of the FIT 2 to the communication base station 12 (step S103). In a case where the predetermined time has not elapsed (step S103, No), the wireless communication part 111 of the wireless communication terminal 11 waits until the predetermined time elapses. On the other hand, in a case where the predetermined time has elapsed (step 103, Yes), the wireless communication part 111 of the wireless communication terminal 11 transmits the terminal's FIT 2 to the communication base station 12 again (step S101).

Next, with reference to FIG. 9, an example of a process executed when deleting the FIT 2 stored in the storage device 112 will be described. FIG. 9 is a flowchart showing an example of a process executed when the wireless communication terminal 11 deletes the FIT 2. Referring to FIG. 9, the FIT deletion part 113 refers to the storage device 112 and confirms whether or not a predetermined time has elapsed from receipt of the FIT 2 (step S201).

In a case where the predetermined time has not elapsed (step S201, No), the FIT deletion part 113 waits until the predetermined time elapses. On the other hand, in a case where the predetermined time has elapsed (step S201, Yes), the FIT deletion part 113 deletes the FIT 2 having passed the predetermined time (step S202).

In a case where the FIT 2 other than the deleted FIT 2 is stored in the storage device 112 (step S203, Yes), the FIT deletion part 113 executes the confirmation at step S201 again. On the other hand, in a case where the FIT 2 other than the deleted FIT 2 is not stored in the storage device 112 (step S203, No), the FIT deletion part 113 ends the process.

Next, with reference to FIG. 10, an example of a process of sensitivity determination will be described. FIG. 10 is a flowchart showing an example of a process executed when the wireless communication terminal 11 performs informing. Referring to FIG. 10, upon receiving the FIT 2, the wireless communication terminal 11 determines whether or not information indicating an attribute, the FIT identification number 21 and so on set as sensitivity in advance is included by the received FIT 2 (step S301).

In a case where the information indicated by the sensitivity is included by the FIT 2 (step S301, Yes), the sensitivity determination part 114 notifies the informing part 115 that the FIT 2 includes the information indicated by the sensitivity. Thus, the informing part 115 performs informing specified in advance such as activating vibration (step S302). On the other hand, in a case where the received FIT 2 does not include the information indicated by the sensitivity (step S301, No), the sensitivity determination part 114 does not notify the informing part 115 that the FIT 2 includes the information indicated by the sensitivity.

Subsequently, an example of a process executed when determining the strength of the FIT 2 will be described with reference to FIG. 11. FIG. 11 is a flowchart showing an example of a process executed when the wireless communication terminal 11 determines the strength of the FIT 2. Referring to FIG. 11, the strength determination part 116 compares the number of the FITs 2 having the same FIT identification number stored in the storage device 112 with a first threshold value A specified in advance (step S401).

In a case where the number of the FITs 2 having the same FIT identification number stored in the storage device 112 is equal to or less than the first threshold value A (step S401, No), the strength determination part 116 ends the process. On the other hand, in a case where the number of the FITs 2 having the same FIT identification number stored in the storage device 112 is more than the first threshold value A (step S401, Yes), the strength determination part 116 determines that the FIT 2 having the FIT identification number is strong (fragrance is strong). Then, the strength determination part 116 notifies the FIT addition/deletion part 117 that the FIT 2 is determined to be strong. Thus, the FIT addition/deletion part 117 adds the FIT 2 determined to be strong to the terminal's FIT 2 (step S402).

Further, the strength determination part 116 compares the number of the FITs 2 having the same FIT identification number determined to be strong with a second threshold value B specified in advance (step S403). In a case where the number of the FITs 2 is more than the second threshold value B (step S403, No) the strength determination part 116 waits without performing the notification to the FIT addition/deletion part 117. On the other hand, in a case where the number of the FITs 2 having the same FIT identification number determined to be strong is equal to or less than the second threshold value B (step S403, Yes) the strength determination part 116 determines that the FIT 2 having the FIT identification number has weakened (fragrance has weakened). Then, the strength determination part 116 notifies the FIT addition/deletion part 117 that the FIT 2 is determined to have weakened. Thus, the FIT addition/deletion part 117 deletes the FIT 2 determined to have weakened from the terminal's FIT 2 (step S404).

Next, with reference to FIG. 12, an example of the operation of the communication base station 12 will be described. FIG. 12 is a flowchart showing an example of a process executed by the communication base station 12. Referring to FIG. 12, the wireless communication part 121 of the communication base station 12 receives the FIT 2 from the wireless communication terminal 11 (step S501). Then, the wireless communication part 121 transmits the FIT 2 other than the FIT 2 having the same identification number as the received FIT 2 among the FITs 2 stored in the storage device 122, to the transmission source wireless communication terminal 11 (step S502). Moreover, the wireless communication part 121 stores the received FIT 2 into the storage device 122 (step S503). The processing at step S03 may be executed earlier than the processing at step S502, or the processing at step S502 and the processing at step S503 may be executed simultaneously.

The FIT deletion part 123 refers to the storage device 122 and confirms whether or not a predetermined time has elapsed since receipt of the FIT 2 (step S504).

In a case where the predetermined time has not elapsed (step S504, No), the FIT deletion part 123 waits until the predetermined time elapses. On the other hand, in a case where the predetermined time has elapsed (step S504, Yes), the FIT deletion part 123 deletes the FIT 2 having passed the predetermined time (step S505).

In a case where the FIT 2 other than the deleted FIT 2 is stored in the storage device 122 (step S506, Yes), the FIT deletion part 123 executes the confirmation at step S504 again. On the other hand, in a case where the FIT 2 other than the deleted FIT 2 is not stored in the storage device 122 (step S506, No), the FIT deletion part 123 ends the process.

The above is an example of the operation of the wireless communication system 1.

An example of use of the FIT 2 described in this exemplary embodiment will be shown. First, an example of using the FIT 2 to identify an individual by will be illustrated.

A User A checks the FIT identification number 21 of User B beforehand. Then, User A sets the FIT identification number 21 of User B as the sensitivity of the wireless communication terminal 11 of the user A.

By thus setting, User A notices that User B, who is his/her friend, is/was present at the same place, for example, in a restaurant or an event venue.

Further, it is possible to use the place information and time information of the FIT2 to follow the trail as a police dog does.

User A can detect the presence of User B who the User A does not want to see and can avoid bumping into User B.

B The user notices that he/she often passes a particular person at the same place. (The user is notified of frequent receipt of the FIT 2 by his/her mobile terminal, or notices that the transferred FIT2 of the person is left on a specific object.)

User: "Is the person a troll in my territory? I'll add a disclosure attribute <threat> to my FIT 2 and rub it here (specify a long time stay)."

User: "Are you like me? I'll leave a message."

C The user has housekeeping AI (artificial intelligence) monitor his/her FIT 2.

Housekeeping AI: "Sniff-sniff, my master's FIT 2 is gone, so I'll turn off the light and start cleaning ♪"

Housekeeping AI: "The transferred FIT of a disclosure attribute <yakiniku barbecue restaurant> is added to the FIT 2 of my master having come home. I'll increase the priority for taking a bath as a proposal for a following activity."

D The user sets sensitivity on the attribute information of a region of interest in his/her wireless communication terminal 11.

The transferred FIT 2 of a disclosure attribute <(electric signboard of) "King Kong—Giant God of Skull Island"> is stuck to the FIT 2 of a passing person! Let me talk to him/her!

Among the members of a family or hobby group, a common private attribute <member of XXX> is set to the FIT of each of the members. When the members pass each other, they notice, "You are a member of my family, but we've never met each other." However, the intention is hidden from others.

Next, an example of identifying a restaurant using the FIT 2 will be illustrated.

For example, a method of installing a SIM into the signboard of a restaurant and using it as the transmission source of the FIT 2 will be shown. When the power of the signboard is turned on, transmission of the FIT 2 is started. When the power is turned off, the FIT 2 disappears from the area (after a certain remaining time).

When a shop is searched for on the Internet, registered information at a certain point in the past stored in the DB is generally referred to. Meanwhile, detection using the FIT 2 allows for use of information that matches the user's own location and the current time.

E The user acquires information on the surrounding FIT 2 at a place where he/she is present currently.

A problem often occurring when a restaurant is searched for on the Internet, such that the restaurant is closed when visited, is unlikely to occur.

When the user becomes aware of being hungry, he/she can "sniff the surrounding FIT". At this time, there is no need to acquire place information by GPS or the like. Specifically, in order to carefully acquire surrounding information, the user not only acquires major information from the base station, but also performs "sniffing operation" to also receive the detailed FIT again.

Depending on the frequency of receipt of the FIT, such as always passing in front of the same restaurant during business hours, the user can receive a recommendation list with priorities of restaurants that are more suitable for the user's commuting route, time of the day, and day of the week. In order to create a similar list by search on the Internet, there is a need to narrow down the user's behavior and input it at the time of searching.

Next, an example of fostering a social atmosphere and using a public FIT 2 will be illustrated. As an example, the FIT of a disclosure attribute <public restroom> or <gas station> will be assumed.

F The user can use information that is suitable for his/her location and the current time, not the registered information stored in the DB.

The FIT 2 is automatically recorded while the user is moving, and it is recalled and confirmed if there is a public restroom on the route the user has been walking (not on the map information base, but on the real base where the SIM is now alive).

A refrigerator using AI adds a disclosure attribute <expired food> to its FIT 2 in accordance with the condition of what is in the refrigerator.

More abstract, "fragrance (FIT 2) of Free Wi-Fi", "fragrance (FIT 2) of a place where there is a need to be strained due to frequent traffic accidents".

G Express a specific taste with the FIT 2

A badge which transmits the FIT 2 indicating a specific taste at an event or the like is distributed (a comic market participant, a Naginata athlete, a member of the Mathematical Society of Japan, a doctor, etc.).

The FIT 2 starts to smell around a bus stop near an event venue, and the FIT 2 becomes stronger and gets stifling as the user approaches the venue.

(Based on the frequency of receipt and the total number of times of receipt of the same attribute, the FIT 2 is determined to be strong.)

The above is an example of use of the FIT 2. The FIT 2 may be used in situations other than those illustrated above.

Thus, as described in this example embodiment, the wireless communication terminal 11 is configured to transmit the FIT 2 that is not transmitted to an external device to the communication base station 12 via the network. Moreover, the wireless communication terminal 11 has the FIT deletion part 113, and is configured to delete the FIT 2 having passed a predetermined time since receipt. That is, the wireless communication terminal 11 is configured to use the FIT 2 that is information associated with place and time. With such a configuration, the FIT 2 behaving in the same manner as a real "fragrance" can be realized. With this, it becomes possible to, for example, acquire only information transmitted in real time and information having not passed a predetermined time since transmission. That is, the above configuration allows for accurate acquisition of available information, for example, corresponding to a place and time where the user is present.

In other words, according to the present invention, it is possible to provide information that allows the user to acquire the maximum information available at a place and time where the user is present without being aware of communication, unlike providing information by the Push technology or the Pull technology in existing IT (information technology). Moreover, it is possible to provide a means for solving and utilizing the enormous number of communications of things conceived in the Internet of Things (JOT) in area units. In addition, according to the method described in this example embodiment, communication is basically limited to when things pass each other and when the FIT is registered in a specific area, and communication widely across networks does not occur.

Identification information of things such as the FIT identification number 21 does not need to be managed at the center as long as it is unique in a specific area.

Further, in this example embodiment, the wireless communication system 1 has the wireless communication terminal 11, the communication base station 12, and the electric signboard 13. However, the wireless communication system 1 does not need to necessarily have the electric signboard 13.

Further, in this example embodiment, from the ease of understanding the usage image, a description has been made with a real place and the FIT 2 bundled. However, the "place" described in the first example embodiment may be an abstract one such as an address on a network.

As an example, a scene in which a WEB (World Wide Web) site on a network is regarded as a place and the FIT 2 of a user who is accessing a specific WEB site at present is used will be considered.

In this scene, it is assumed that the FIT 2 of the WEB site (corresponding to the electric signboard 13) and the user's own FIT 2 (corresponding t to the wireless communication terminal 11) are created and the server of the WEB site (corresponding to the communication base station 12) is responsible for storing the FITs 2.

By collecting the FITs 2 stored in the server of the site, the user can notice a login by the user's friend to the site or an evidence that the user's friend has accessed until a while ago the site without depending on a function such as site log check. Moreover, by checking the FIT 2 of another WEB site remaining on the FIT 2 of the user's friend, the user can trace the content of the other WEB site which the friend has visited.

Second Example Embodiment

Next, with reference to FIG. 13, a second example embodiment of the present invention will be described. In the second example embodiment, the overview of the configuration of a wireless communication terminal 3 will be described.

Figure 13:
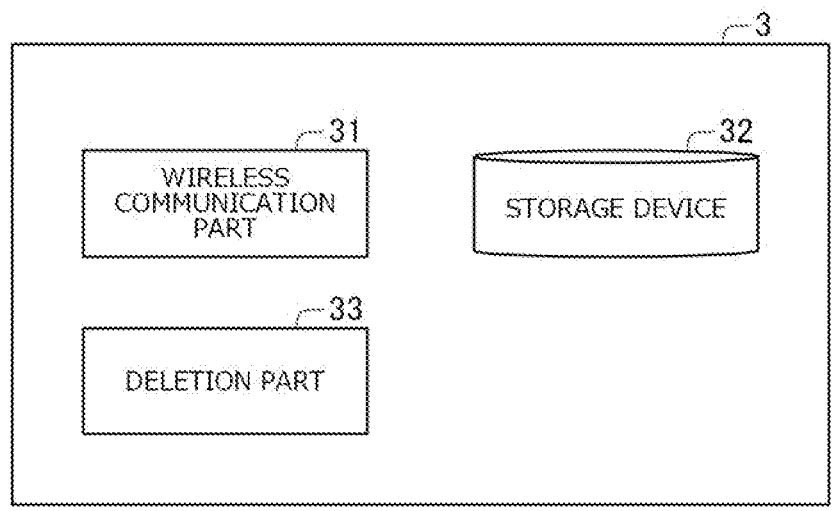
FIG. 13 is a block diagram showing an example of the configuration of a wireless communication terminal 3 in a second example embodiment of the present invention.

Referring to FIG. 13, the wireless communication terminal 3 has a wireless communication part 31, a storage device 32, and a deletion part 33. For example, the wireless communication terminal 3 has a CPU serving as an arithmetic logic unit and a storage unit, which are not shown, and realizes the above processing parts by the CPU executing a program stored in the storage unit.

The wireless communication part 31 transmits temporarily remaining information that is information linked with place and time to a communication base station. Moreover, the wireless communication part 31 receives temporarily remaining information stored in the communication base station from the communication base station.

In the storage unit 32, the temporarily remaining information received by the wireless communication part 31 is stored.

The deletion part 33 deletes temporarily remaining information stored in the storage unit 32. For example, the deletion part 33 deletes temporarily remaining information having passed a predetermined time since receipt of the temporarily remaining information.

Thus, the wireless communication terminal 3 is configured to transmit temporarily remaining information that is information linked with place and time to the communication base station. Moreover, the wireless communication terminal 3 has the deletion part 33. With such a configuration, the deletion part 33 deletes temporarily remaining information when a predetermined time has elapsed since storage of the temporarily remaining information. Consequently, it is possible to acquire only information transmitted in real time and information before a predetermined time elapses. That is to say, the above configuration allows for accurate acquisition of available information, for example, corresponding to place and time where the user is present.

Further, the abovementioned wireless communication terminal 3 can be realized by a predetermined program being installed in the wireless communication terminal 3. To be specific, a program according to another aspect of the present invention is a program for causing a wireless communication terminal to realize a wireless communication part and a deletion part. The wireless communication terminal has a storage device for storing temporarily remaining information received by the wireless communication part. The wireless communication part transmits the temporarily remaining information, which is information linked with place and time, to a communication base station, and also receives temporarily remaining information stored in the communication base station from the communication base station. The deletion part deletes temporarily remaining information having passed a predetermined time since receipt of the temporarily remaining information.

Further, a wireless communication method executed by the abovementioned wireless communication terminal 3 is a method in which the wireless communication terminal transmits temporarily remaining information, which is information linked with place and time, to a communication base station, and also receives temporarily remaining information stored in the communication base station from the communication base station, stores the received temporarily remaining information, and deletes the temporarily remaining information having passed a predetermined time since receipt of the temporarily remaining information.

Because the invention of the program or the wireless communication method having the abovementioned configuration also has the same action as the abovementioned wireless communication terminal, it can achieve the abovementioned object of the present invention.

Further, likewise, the invention of the communication base station or the electric signboard can also achieve the object of the present invention.

For example, the communication base station is configured to include: a storage device for storing temporarily remaining information, which is information linked with place and time; a wireless communication part that receives the temporarily remaining information from a wireless communication terminal and also transmits the temporarily remaining information stored in the storage device to the wireless communication terminal; and a deletion part that deletes the temporarily remaining information having passed a predetermined time since receipt of the temporarily remaining information.

Further, for example, the electric signboard is configured to include; a storage device for storing temporarily remaining information, which is information linked with place and time; and a wireless communication part that transmits the temporarily remaining information stored in the storage device to the wireless communication terminal.

<Supplementary Notes>

The whole or part of the example embodiments disclosed above can be described as the following supplementary notes. Below, the overview of the wireless communication terminal and so on according to the present invention will be described. However, the present invention is not limited to the following configurations.

(Supplementary Note 1)

A wireless communication terminal comprising:

a wireless communication part configured to transmit temporarily remaining information to a communication base station and receive the temporarily remaining information stored in the communication base station from the communication base station, the temporarily remaining information being information linked with place and time;

a storage device in which the temporarily remaining information received by the wireless communication part is stored; and a deletion part configured to, after receipt of the temporarily remaining information, delete the temporarily remaining information having passed a predetermined time specified in advance.

(Supplementary Note 2)

The wireless communication terminal according to Supplementary Note 1, wherein the temporarily remaining information includes attribute information indicating an attribute corresponding to what a transmitter of the temporarily remaining information provides.

(Supplementary Note 3)

The wireless communication terminal according to Supplementary Note 1 or 2, wherein the temporarily remaining information is information which is not transmitted outside from the receiving communication base station via a network, but is stored in the receiving communication base station and deleted after a lapse of a predetermined time.

(Supplementary Note 3-1)

The wireless communication terminal according to any of Supplementary Notes 1 to 3, wherein the temporarily remaining information includes at least one of public attribute information and private attribute information, the public attribute information indicating an attribute shared by many and unspecified users, the private attribute information indicating an attribute shared only by specific users.

(Supplementary Note 4)

The wireless communication terminal according to any of Supplementary Notes 1 to 3, further comprising:

a strength determining unit configured to perform determination of strength of the temporarily remaining information stored in the storage device; and a remaining information addition part configured to add the temporarily remaining information to other temporarily remaining information based on a result of the determination by the strength determining unit.

(Supplementary Note 5)

The wireless communication terminal according to Supplementary Note 4, wherein the strength determining unit is configured to perform the determination of the strength of the temporarily remaining information based on a number of the temporarily remaining information having same information.

(Supplementary Note 5-1)

The wireless communication terminal according to Supplementary Note 5, wherein the strength determining unit is configured to perform the determination of the strength of the temporarily remaining information based on a number of the temporarily remaining information having same information for identifying the temporarily remaining information.

(Supplementary Note 5-2)

The wireless communication terminal according to Supplementary Note 5 or 5-1, wherein the strength determining unit is configured to perform the determination of the strength of the temporarily remaining information based on a number of the temporarily remaining information having same attribute information indicating an attribute corresponding to what a transmitter of the temporarily remaining information provides (Supplementary Note 6)

The wireless communication terminal according to any of Supplementary Notes 1 to 5, further comprising:

a sensitivity determination part configured to perform determination whether the received temporarily remaining information includes predetermined information; and an informing part configured to perform predetermined informing based on a result of the determination by the sensitivity determination part.

(Supplementary Note 6-1)

The wireless communication terminal according to Supplementary Note 6, wherein the wireless communication part is configured to transmit and receive the temporarily remaining information to and from another wireless communication terminal located in neighborhood by near field communication.

(Supplementary Note 7)

A wireless communication method executed by a wireless communication terminal, the method comprising:

transmitting temporarily remaining information to a communication base station and receiving the temporarily remaining information stored in the communication base station from the communication base station, the temporarily remaining information being information linked with place and time;

storing the received temporarily remaining information; and after receipt of the temporarily remaining information, deleting the temporarily remaining information having passed a predetermined time specified in advance.

(Supplementary Note 8)

A non-transitory computer-readable recording medium having a program recorded thereon, the program comprising instructions for causing a wireless communication terminal including a storage device in which temporarily remaining information received by a wireless communication part is stored, to realize:

the wireless communication part configured to transmit the temporarily remaining information to a communication base station and receive the temporarily remaining information stored in the communication base station from the communication base station, the temporarily remaining information being information linked with place and time; and a deletion part configured to, after receipt of the temporarily remaining information, delete the temporarily remaining information having passed a predetermined time specified in advance.

(Supplementary Note 9)

A communication base station comprising:

a storage device in which temporarily remaining information is stored, the temporarily remaining information being information linked with place and time;

a wireless communication part configured to receive the temporarily remaining information from a wireless communication terminal and transmit the temporarily remaining information stored in the storage device to the wireless communication terminal; and a deletion part configured to, after receipt of the temporarily remaining information, delete the temporarily remaining information having passed a predetermined time specified in advance.

(Supplementary Note 9-1)

A base station communication method executed by a communication base station including a storage device in which temporarily remaining information is stored, the temporarily remaining information being information linked with place and time, the method comprising:

receiving the temporarily remaining information from a wireless communication terminal and transmitting the temporarily remaining information stored in the storage device to the wireless communication terminal; and after receipt of the temporarily remaining information, deleting the temporarily remaining information having passed a predetermined time specified in advance.

(Supplementary Note 9-2)

A non-transitory computer-readable recording medium having a program recorded thereon, the program comprising instructions for causing a communication base station including a storage device in which temporarily remaining information that is information linked with place and time is stored, to realize:

a wireless communication part configured to receive the temporarily remaining information from a wireless communication terminal and transmit the temporarily remaining information stored in the storage device to the wireless communication terminal; and a deletion part configured to, after receipt of the temporarily remaining information, delete the temporarily remaining information having passed a predetermined time specified in advance.

(Supplementary Note 10)

An electric signboard comprising:

a storage device in which temporarily remaining information is stored, the temporarily remaining information being information linked with place and time; and a wireless communication part configured to transmit the temporarily remaining information stored in the storage device to a communication base station.

(Supplementary Note 10-1)

An electric signboard communication method executed by an electric signboard including a storage device in which temporarily remaining information is stored, the temporarily remaining information being information linked with place and time, the method comprising transmitting the temporarily remaining information stored in the storage device to a communication base station.

(Supplementary Note 10-2)

A non-transitory computer-readable recording medium having a program recorded thereon, the program comprising instructions for causing an electric signboard including a storage device in which temporarily remaining information that is information linked with place and time is stored, to realize:

a wireless communication part configured to transmit the temporarily remaining information stored in the storage device to a communication base station.

The program described in the example embodiments and supplementary notes is stored in a storage device or recorded on a computer-readable recording medium. For example, the recording medium is a portable medium such as a flexible disk, an optical disk, a magnetooptical disk, and a semiconductor memory.

Although the present invention has been described with reference to the example embodiments, the present invention is not limited to the example embodiments described above. The configurations and details of the present invention can be changed in various manners that can be understood by one skilled in the art within the scope of the present invention.

The present invention is based upon and claims the benefit of priority from Japanese patent application No. 2018-000155, filed on Jan. 4, 2018, the disclosure of which is incorporated herein in its entirety by reference.

DESCRIPTION OF REFERENCE NUMERALS 1 wireless communication system
11 wireless communication terminal 111 wireless communication part
112 storage device
113 FIT deletion part
114 sensitivity determination part
115 informing part
116 strength determination part
117 FIT addition/deletion part
118 attribute setting part
12 communication base station
121 wireless communication part
122 storage device
123 FIT deletion part
13 electric signboard
131 wireless communication part
132 storage device
2 FIT
21 FIT identification number
22 attribute information (public)
23 attribute information (private)
3 wireless communication terminal
31 wireless communication part
32 storage device
33 deletion part

The invention claimed is:

1. A wireless communication terminal comprising:
at least one memory configured to store instructions; and
at least one processor configured to execute instructions to:
transmit temporarily remaining information to a communication base station and receive the temporarily remaining information stored in the communication base station from the communication base station, the temporarily remaining information being information linked with place and time;
store, in a storage device, the temporarily remaining information received by the wireless communication part; and
after receipt of the temporarily remaining information, delete the temporarily remaining information having passed a predetermined time specified in advance, wherein
the temporarily remaining information is information which is not transmitted outside from the receiving communication base station via a network, but is stored in the receiving communication base station and deleted after a lapse of a predetermined time.

2. The wireless communication terminal according to claim 1, wherein the temporarily remaining information includes attribute information indicating an attribute corresponding to what a transmitter of the temporarily remaining information provides.

3. The wireless communication terminal according to claim 1, wherein the temporarily remaining information includes at least one of public attribute information and private attribute information, the public attribute information indicating an attribute shared by many and unspecified users, the private attribute information indicating an attribute shared only by specific users.

4. The wireless communication terminal according to claim 1, wherein said at least one processor is further configured to execute instructions to:
perform determination of strength of the temporarily remaining information stored in the storage device; and
add the temporarily remaining information to other temporarily remaining information based on a result of the determination.

5. The wireless communication terminal according to claim 4, wherein the at least one processor is further configured to perform the determination of the strength of the temporarily remaining information based on a number of the temporarily remaining information having same information.

6. The wireless communication terminal according to claim 5, wherein the at least one processor is further configured to perform the determination of the strength of the temporarily remaining information based on a number of the temporarily remaining information having same information for identifying the temporarily remaining information.

7. The wireless communication terminal according to claim 5, wherein the at least one processor is further configured to perform the determination of the strength of the temporarily remaining information based on a number of the temporarily remaining information having same attribute information indicating an attribute corresponding to what a transmitter of the temporarily remaining information provides.

8. The wireless communication terminal according to claim 1, wherein said at least one processor is further configured to execute instructions to:
perform determination whether the received temporarily remaining information includes predetermined information; and
perform predetermined informing based on a result of the determination.

9. The wireless communication terminal according to claim 8, wherein said at least one processor is further configured to transmit and receive the temporarily remaining information to and from another wireless communication terminal located in neighborhood by near field communication.

10. A wireless communication method executed by a wireless communication terminal, the method comprising:
transmitting temporarily remaining information to a communication base station and receiving the temporarily remaining information stored in the communication base station from the communication base station, the temporarily remaining information being information linked with place and time;
storing, in a storage device, the received temporarily remaining information; and after receipt of the temporarily remaining information, deleting the temporarily remaining information having passed a predetermined time specified in advance, wherein the temporarily remaining information is information which is not transmitted outside from the receiving communication base station via a network, but is stored in the receiving communication base station and deleted after a lapse of a predetermined time.

11. A communication base station comprising:
a storage device in which temporarily remaining information is stored, the temporarily remaining information being information linked with place and time;
at least one memory configured to store instructions; and
at least one processor configured to execute instructions to:
receive the temporarily remaining information from a wireless communication terminal and transmit the temporarily remaining information stored in the storage device to the wireless communication terminal; and
after receipt of the temporarily remaining information, delete the temporarily remaining information having passed a predetermined time specified in advance, wherein the temporarily remaining information is information which is not transmitted outside from the receiving communication base station via a network, but is stored in the receiving communication base station and deleted after a lapse of a predetermined time.

* * * * *